Nov. 27, 1951     J. BOYKO     2,576,712
POLYMERIZATION OF LIQUID POLYMERIZABLE ORGANIC
COMPOUNDS IN ELONGATED SHAPES
Filed Aug. 30, 1949
FIG. I.
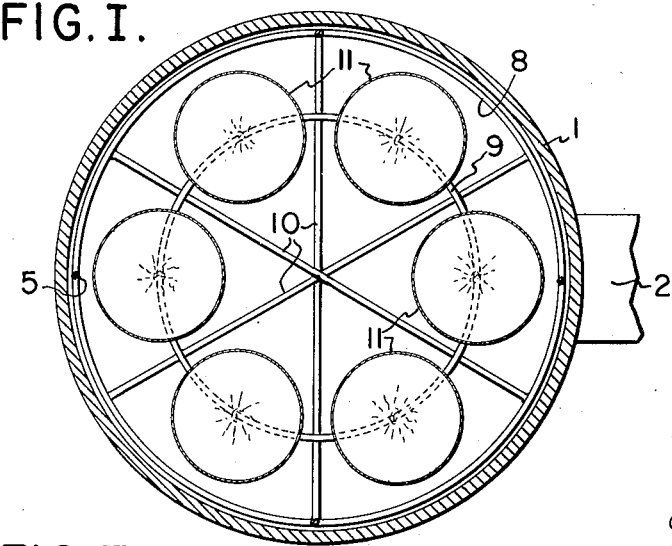
FIG. II.
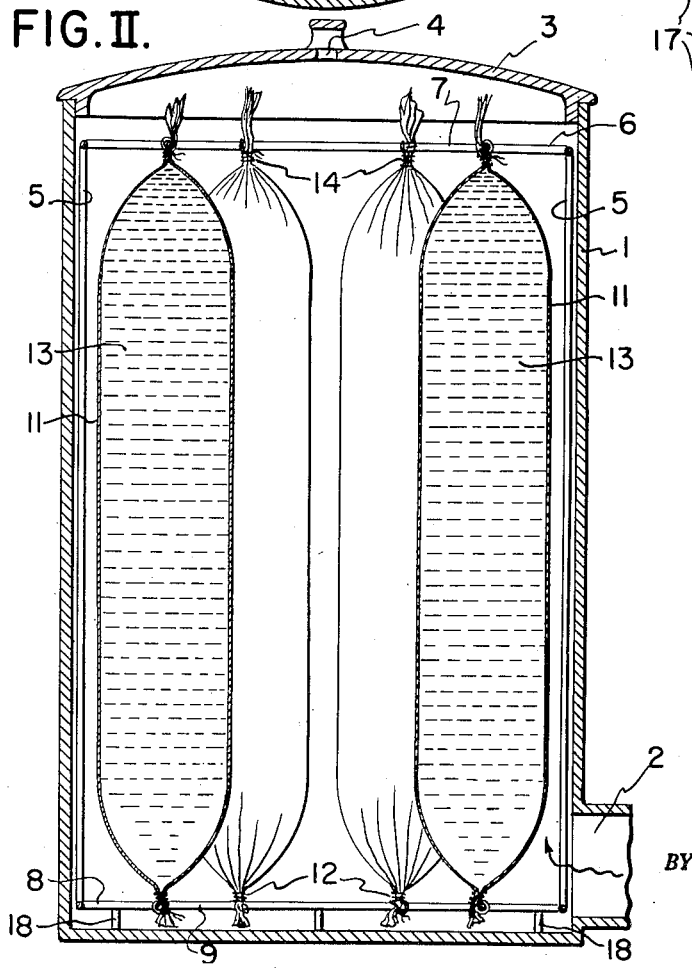
FIG. III.
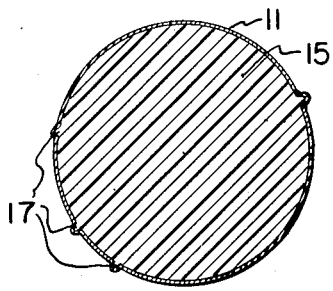
FIG. IV.
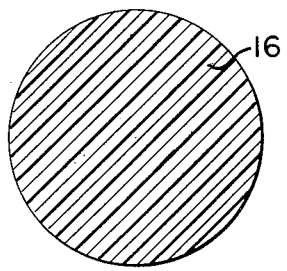
INVENTOR.
JOHN BOYKO
BY
J. M. Castle Jr.
ATTORNEY Patented Nov. 27, 1951

2,576,712

UNITED STATES PATENT OFFICE 2,576,712

POLYMERIZATION OF LIQUID POLYMERIZABLE ORGANIC COMPOUNDS IN ELONGATED SHAPES

John Boyko, Union, N. J., assignor to E. I. du Pont de Nemours and Company, Wilmington, Del., a corporation of Delaware Application August 30, 1949, Serial No. 113,132

6 Claims. (Cl. 18—58)

This invention relates to a process of polymerizing liquid polymerizable organic compounds in elongated shapes and, more particularly, to a process of polymerizing methyl methacrylate in the form of rods.

Heretofore, various liquid polymerizable organic compounds, particularly methyl methacrylate compositions, have been polymerized in the form of rods and other elongated shapes by the process disclosed in Fields U. S. Patent 2,057,674. In following this process, the apparatus disclosed in Fields U. S. Patent 2,238,443 has been used. This apparatus essentially consists of a plurality of elongated metal tubes, usually aluminum, vertically disposed in a container capable of confining a liquid. The process comprises introducing a heated liquid into the container and slowly raising the level of the liquid to polymerize the liquid polymerizable organic compound contained within the tubes at the level corresponding to the level of the heated liquid. The space above the heated liquid is maintained at a lower temperature to prevent premature polymerization at levels above the heated liquid. Such a process of casting in metal tubes tends to give relatively low yields of satisfactory rods. In general, the rejected polymer rods contained voids owing to shrinkage of the polymer from rigid container walls. Other difficulties include adhesion of the polymer to the metal walls thereby complicating removal of the polymer rod from the mold.

Another prior art method of producing polymer rods is to cast a liquid polymerizable organic compound in the form of a sheet in a cell composed of two sheets of glass separated by a compressible gasket, as disclosed in Rohm U. S. Patent 2,154,639. The polymeric sheet is cut into rods of square cross section, and cylindrical rods are cut by grinding on a lathe. In view of the amount of labor involved in preparing the cells for casting polymeric sheets, in addition to the amount of polymer wasted in cutting and grinding, this process is not entirely satisfactory.

An object of the present invention is to provide a simplified, more economical and highly efficient method of producing polymeric materials in the form of elongated shapes. A more specific object is to provide a more simplified, economical and highly efficient process for producing polymethyl methacrylate rods or elongated cylinders. Other objects will be apparent from the description of the invention given hereinafter.

The above objects are accomplished according to the present invention by introducing a liquid polymerizable organic compound into a substantially vertically positioned, elongated cylindrical casing of a synthetic linear polyamide closed at the bottom, the wall of the casing being 0.002 to 0.010 inch thick and having a tensile strength equal to $$\frac{PDF}{2T}$$

wherein P is the maximum pressure, expressed in pounds per square inch, exerted by the polymerizable compound against the wall of the casing, D is the inside diameter, expressed in inches, of the casing, F is a factor ranging from 3.5 to 5, and T is the wall thickness of the casing expressed in inches, closing the upper end of the casing, and thereafter polymerizing the polymerizable compound contained in the casing while maintaining the casing in vertical position.

In a preferred form, the invention comprises using methyl methacrylate as the liquid polymerizable organic compound and the casing used is from 12 to 72 inches long and has an inside diameter of 1 to 6 inches. It is still more preferred to use a casing which is 12 to 54 inches long and has an inside diameter of 1 to 2 inches.

The present invention resides in great part in the discovery that casings of synthetic linear polyamides within the wall thickness specified above and having a tensile strength equal to that specified, inherently possessed the elasticity which permits such casings to be used with a high degree of satisfaction in the polymerization of liquid polymerizable organic compounds in the form of rods. The invention is applicable to any liquid polymerizable organic compound convertible to a solid upon polymerization and is particularly useful in the production of rods of polymethyl methacrylate. Ordinarily, the polymerizable compound will be polymerized by subjecting the filled casing to thermal energy although actinic energy may be used. After polymerization, the casing is stripped from the solid rod formed and the rod is then ground to give a smooth flawless surface.

The invention will be further described with reference to the accompanying drawing wherein:

Fig. I is a horizontal section through an apparatus adapted for carrying out the present invention;

Fig. II is a vertical section through the apparatus shown in Fig. I;

Fig. III is a section, at right angles to the major axis, of a polymer rod before removal of the polyamide casing; and Fig. IV is a section through the same rod after stripping the casing and grinding to remove surface imperfections.

Referring to Figs. I and II, reference numeral 1 designates a simple circulating air oven provided with hot air inlet 2 and removable cover 3 having the air outlet 4. Disposed in the oven 1 is a metal rack consisting of uprights 5, two upper concentric rings 6 and 7, two lower concentric rings 8 and 9 and radial braces 10 at top and bottom, the bottom ones only being illustrated. The ring 8 carries a plurality of feet 18 on which the rack rests.

The metal rack is designed to hold a plurality of filled casings 11 between the inner concentric rings 7 and 9. In carrying out the process, the casings 11 are tied at their lower ends 12, filled with the polymerizable liquid 13, and then tied at the upper ends 14, preferably so substantially all air is excluded. The filled casings 11 are then tied to the ring 7 and thus suspended. They are also tied at the bottom to the ring 9 to keep the casings aligned and to maintain them under a slight tension. After the casings 11 are mounted in the rack, the rack is placed in the oven 1 and the oven is maintained at the desired temperature until polymerization is complete. Thereafter, if desired, an "after" heat treatment may be given at a higher temperature with the tension on the casings 11 somewhat increased to insure straightness of the rods formed. This is optional and may be carried out in oven 1 or the rack may be removed to a second oven maintained at the higher temperature.

Upon completion of the polymerization there will be obtained in each casing 11 a rod of polymer substantially flawless except for a few surface wrinkles about $\frac{1}{16}$ to $\frac{1}{8}$ inch in depth. Fig. III shows a section through a rod 15 of polymer with the casing 11 not yet removed. Wrinkles are indicated at 17. The casing 11 is then stripped from the rod which is ground to remove the small wrinkles and given a flawless surface, a section of the finished rod 16 being shown in Fig. IV.

The following example, wherein all parts are by weight, unless otherwise specified, illustrates a specific embodiment of the present invention.

*Example I*

A synthetic linear interpolyamide was formed by reacting 40 parts of hexamethylene diammonium adipate, 30 parts of hexamethylene diammonium sebacate, and 30 parts of caprolactam under conditions similar to those recited in Example I of Brubaker U. S. Patent 2,285,009. Molding powder produced from the resulting interpolymer was extruded to form tubular casings of various wall thicknesses and diameters. Five tubular casings having specifications indicated in Table I were extruded. Also indicated in Table I are the diameters of the finished rods cast in a casing having the indicated specifications, and the amount of catalysts added to the methyl methacrylate syrup prior to introduction into the tubular casings.

*Table I*

| Diameter of Casing | Wall Thickness of Casing | Diameter of Finished Polymethyl Methacrylate Rod | Catalyst Concentration |
| --- | --- | --- | --- |
| Inches | Inches | Inches | Per cent |
| 1.90 | 0.002–0.003 | 1.0 | 0.00075 |
| 2.30 | 0.002–0.003 | 1.25 | 0.00075 |
| 2.70 | 0.003–0.004 | 1.50 | 0.0005 |
| 3.25 | 0.003–0.004 | 1.75 | 0.000425 |
| 3.60 | 0.004–0.005 | 2.0 | 0.0004 |

The polyamide casings were cut to lengths of 60 inches. A smooth knot was tied at one end of each casing by creasing the end into about ¼" flat folds, then forming a loop and drawing it tight.

Monomeric methyl methacrylate containing about 0.0015% of alpha,alpha'-azobis (alpha,-gamma dimethylvaleronitrile) by weight of the methyl methacrylate was heated in a vessel at about 80° C. until a syrup having a viscosity of from 15–20 poises was formed. The syrup was divided into five portions to which were added further quantities of catalysts as set forth in Table I, the percentages given being by weight of the methyl methacrylate. The five polyamide casings were then filled with the five portions of syrup. Each casing was filled to a level so that the finished rod would be about 54 inches in length. Upon filling, the top of each casing was closed by tying a string around the casing at the liquid level. This same string was used to suspend each of the filled casings in a vertical position from a rack as in Figs. I and II. A slight amount of tension was maintained on the casings by tying the lower ends thereof to the bottom of the rack.

The rack from which the loaded casings were suspended was lowered into an oven which was maintained at about 46° C. by circulating hot air.

After about 48 hours, the rods were checked to make sure that the polymer was firm and that shrinkage had taken place. The rack was then removed from the oven and placed in a second circulating air oven at about 110° C. for about 4 hours. After this time, more tension was put on the casings to insure straightness of the rods.

Each of the polymethyl methacrylate rods was stripped of its polyamide casing and thereafter each was ground to the corresponding finished diameter indicated in the above table. After grinding, the rods were polished to form finished rods having smooth surfaces and high clarity.

Although the surfaces of the polymerized rods prior to grinding are very slightly irregular, at the most only one or two ridges or wrinkles are formed, these extending along the length of the rod. In general, any wrinkles formed vary from about $\frac{1}{16}$" to $\frac{1}{8}$" in depth, which results in a minimum loss of polymer in the grinding operation. This illustrates an important advantage of using a polyamide casing which shrinks substantially uniformly with the polymer because of its superior elasticity as compared with other types of films.

The above example is merely illustrative and the invention broadly comprises polymerizing a liquid polymerizable organic compound in an elongated cylindrical casing of a synthetic linear polyamide of the type hereinbefore described.

In general, a satisfactory casing material must possess suitable strength to contain an amount of polymerizable liquid equivalent to that necessary to cast the maximum size rod desired without bulging, tearing or excessive stretching. In addition to adequate strength or toughness required to contain a particular amount of a liquid polymerizable organic compound, casings suitable for use in this invention must also be inert to the monomer being polymerized in addition to all additives contained in the monomer. Furthermore, the casing must be nonpermeable to all liquid monomers and, of great importance, the casing material must be sufficiently elastic to contract uniformly with the shrinkage always accompanying the conversion of a liquid polymerizable compound to a solid polymer. The casing material must not only possess the foregoing properties at ordinary temperatures but should also retain these properties under all polymerization conditions. Obviously, if polymerization is to be carried out with actinic light, the casing should be capable of transmitting actinic light to the contents thereof.

It has been found that synthetic linear polyamides possess the unique combination of properties discussed above to a remarkable degree and thus are outstandingly useful as the material for flexible casing for polymerizing polymerizable liquids in the form of rods. In so far as applicant is aware, no other material suitable enough to be practical for this purpose has been found, each plausible material being seriously deficient in one respect or another. For example, cellophane which might appear suitable for the purpose, is not sufficiently elastic to contract uniformly with shrinkage of the polymer and, consequently, deep wrinkles are formed on the surface of the rod of polymer, requiring much more grinding to give a smooth surface and thus appreciably lowering the yield of finished rod.

While synthetic linear polyamides are in general suitable for use in the casings of this invention, there are certain qualifying factors which must be observed in order to practice the invention. The thickness of the wall of the casing for practical purposes should be between 0.002 and 0.010 inch. It has been found that, within this thickness range, the thickness of the wall must be correlated with the particular polyamide selected so that the casing wall as a tensile strength equal to that expressed by the formula $$\frac{PDF}{2T}$$

as otherwise the casing will tend to tear, bulge or stretch excessively or will not have sufficient elasticity to shrink with the contraction of the polymerizing compound. In this formula P is the maximum pressure, expressed in pounds per square inch, exerted by the polymerizable compound against the wall of the casing. This maximum pressure is exerted against the wall of the casing at the bottom and is equal to the height of the column of the polymerizable compound in the casing multiplied by the density of the polymerizable compound and, hence, is readily determined. D and T are, respectively, the inside diameter and wall thickness of the casing both expressed in inches and readily measured.

In the above formula F is a factor ranging from 3.5 to 5. Experimental work has shown that if the tensile strength of the casing wall equals $$\frac{PDF}{2T}$$

where F is any value from 3.5 to 5, the polyamide casing will be satisfactory both with respect to elasticity and to resistance to tearing or stretching excessively. This formula, except for the factor F, denotes what is known as the hoop stress exerted by a liquid on a cylindrical container as explained on p. 258 in "Formulas for Stress and Strain" by R. J. Roark, 2nd Ed., 1943, published by McGraw-Hill Company, New York.

Tensile strength as referred to herein is equivalent to yield strength as defined in "ASTM Standards on Plastics," September 1948, page 586. Yield strength is defined as the stress at which a material exhibits a specified limiting permanent set. The tensile or yield strength of the synthetic linear polyamides of the present invention can be measured with any suitable film testing machine of the constant rate of loading type. It should be equipped with a device for recording the tensile load carried by the specimen and recording the rate of jaw separation during the test. Further details of measuring the tensile strength of a plastic film are given in "ASTM Standards on Plastics," pages 476 to 480. It is measured in a direction perpendicular to the longitudinal axis of the polyamide tubular casing, and the stress in this direction is the above-mentioned hoop stress. The tensile or yield strength as used herein is that at 1% Offset. The Offset Method is discussed on pages 586 and 587 of "ASTM Standards on Plastics." The tensile strength at 1% Offset indicates that at a stress of X pounds per square inch the approximate permanent set of the material reached the value of 1% (equivalent to .01 inch per inch gage length). As thus measured, the tensile strength of the polyamide film used in Example I was approximately 2,200 pounds per square inch.

The polyamide casings of the present invention may be fabricated by heat sealing films or by directly extruding a molding powder. The latter method is preferred for fabricating casings in the form of tubes for use in this invention, and may be carried out as follows:

The polyamide molding powder, pre-dried to eliminate excess moisture, is fed to the hopper of a plastics extrusion machine having a tubing die of dimensions for producing tubing having a wall thickness of approximately 0.125 inch. The tubing die is provided with an opening in the center so that a metered amount of air is injected into the extruded tube to maintain the tube in an inflated condition during subsequent handling. The extruded tube, upon emerging from the die maintained at about 200° C., passes through a series of cooling jets, and thereafter the inflated tube is contacted by a variable speed belt, which applies tension to the tube to draw it to the desired final wall thickness. Although the tube has passed through the series of cooling jets whereby it is cooled sufficiently to permit handling, before it contacts the variable speed belt, actually the tension applied to the tube by the variable speed belt causes the tube to be drawn in the so-called hot zone immediately adjacent to the tubing die and preceding the cooling jets. This is a hot drawing operation which does not serve to orient the molecules of the polyamide in the tube as would occur if the tube were cold drawn.

Subsequent to drawing in the hot zone, the tubing is cooled as it passes through the series of cooling jets spaced uniformly around the periphery of the tubing for a distance of approximately one foot longitudinally of the tubing. These jets are constructed to direct uniform streams of air having equalized pressure over the entire outside surface of the tube. The jets provide for a low velocity but a high volume of air, the jets being directed at an angle against the tubes so that the air moves concurrently with the tube. Upon emerging from the cooling zone, the tube is at a temperature of approximately 65° C. From this point until the tube reaches the variable speed belt, the tube is "floated" over a series of wooden spools. These spools minimize friction of the tube which is still sticky at this point. The type of belt arrangement used to apply tension to the tube may vary. For example, two horizontally-disposed parallel belts may be used to contact the upper and lower surfaces of the tube, the degree of contact being sufficient to draw the tube to the desired wall thickness, but regulated to prevent excessive pressure on the inflated tube. Another method of applying tension to the tube is to clamp the walls of the tubing together at various intervals, assuming that the tubing is to be severed at these intervals, and tension is applied to the clamping device to carry out the drawing operation. Following the drawing step, the tube is collapsed at various intervals and severed from the adjacent portion at the collapsed section.

Tubing having a particular wall thickness is readily obtained by varying the tension applied to the extruded tube through regulating the speed of the variable speed belt. The hot tubing may be drawn from a wall thickness of about 0.125 inch down to practically any desired thickness, for example, from 0.00025 inch to 0.005 inch. The above method provides for the continuous production of thin wall polyamide tubing having reproducible diameter and wall thickness, and it eliminates dragging of the hot tubing at the die exit as is customarily obtained when directly extruding thin wall tubing.

Casings fabricated from any type of synthetic linear polyamide or interpolyamide disclosed in Carothers U. S. Patent 2,130,523 may be used in the present invention. It is preferred, however, to use casings fabricated from the type of interpolymer illustrated in Example I. Besides the interpolymer given in Example I, another particularly preferred interpolymer is formed by reacting 36 parts of hexamethylene diammonium adipate, 26 parts of hexamethylene diammonium sebacate, and 38 parts of caprolactam.

The manner of handling the polyamide casings of this invention with regard to sealing, filling with liquid monomer, suspending the filled casings during the polymerization cycle, carrying out polymerization, and finally stripping the polyamide films from the polymer form will be readily apparent to those skilled in the art. As illustrated in Example I, the most expedient method of handling the filled casings during the polymerization cycle is to suspend the casing from one end and fix the other extremity to a rigid support with application of a slight amount of tension on the mold. Various precautions to be taken will also occur in handling the casings prior to filling and during polymerization. For example, excessive stretching of the casing should be avoided when sealing either extremity thereof by tying a knot. Other means for sealing the extremities of the casing may be used.

The invention is manifestly applicable broadly to liquid organic compounds that may be polymerized to polymers solid at ordinary temperatures. Obviously, the invention is of greater value as applied to those compounds which give solid polymers of the most useful properties and, normally, the invention will be applied to polymerizable organic compounds which give rigid castings.

A large class of liquid polymerizable organic compounds adapted for use in this invention are the ethylenically unsaturated compounds which are polymerizable by the action of light or heat, either alone or in a mixture with one or more similar compounds. Among such compounds are the amides, esters, and the nitriles of acrylic, chloroacrylic and alkacrylic acids, e. g., methacrylamide, methyl acrylate, methyl chloroacrylate, methyl methacrylate, ethyl methacrylate, butyl methacrylate, ethoxyethyl methacrylate, glycol dimethacrylates, methyl ethacrylate, ethyl ethacrylate, acrylonitrile, methacrylonitrile; other vinyl and vinylidene compounds, e. g., vinyl acetate, vinyl chloride, vinylidene chloride, vinyl ethers, styrene, methyl styrene, allyl chloride, and dimethyl itaconate. Numerous other organic compounds possessing the requisite properties herein discussed will readily occur to those skilled in the art.

It is ordinarily preferable to start with the polymerizable liquid organic compound in partially polymerized condition, i. e., as a more or less viscous syrup rather than with a straight organic liquid. The use of a syrup shortens the duration of the process, and also reduces the possibility of any leaks through the sealed portions of the casing. Usually a syrup having a viscosity of between 10 and 20 poises is preferred, but it is to be understood that the present invention is not limited to the use of a liquid polymerizable organic compound of any particular consistency, the monomeric form being entirely satisfactory and syrups of higher viscosity being advantageous under certain conditions. Furthermore, various dyestuffs, plasticizers, lubricants, pearlescent materials, other types of effect materials, and other modifiers may be incorporated with the polymerizable liquid organic compounds to obtain certain desirable characteristics in the finished product, according to well-known practices in the art.

When polymerization is to be carried out by thermal means, various well-known polymerization catalysts may be used. These include benzoyl peroxide, lauroyl peroxide, acetyl benzoyl peroxide, diacetyl peroxide, tertiary butyl perbenzoate and p-chloro benzoyl peroxide. Also, various azo catalysts may be used, and these are disclosed in Hunt U. S. Patent 2,471,959. Among the preferred catalysts are alpha,alpha'-azobis (alpha,gamma dimethylvaleronitrile); alpha,alpha'-azo-diisobutyronitrile; diethyl alpha,alpha'-azodiisobutyrate; and alpha,alpha'-azodicyclohexanecarbonitrile.

When polymerization is to be carried out with actinic light, various polymerization catalysts which may be used include benzoin and similar vicinal ketaldonyl and acyloin compounds as disclosed in Agre U. S. Patents 2,367,660 and 2,367,661, and also various azo-type catalysts such as alpha,alpha'-azodiisobutyronitrile, as disclosed in Salisbury U. S. application Serial Number 655,013 now abandoned.

Depending upon the particular conditions, the amount of catalyst and the liquid polymerizable organic compounds, the temperature of polymerization may vary from room temperature up to 130° C. When photopolymerization is used, temperatures below room temperature may be advantageous, particularly when large diameter castings are being polymerized. The selection of an optimum temperature under any given condition as well as the specific catalyst and amount thereof used, will be based on the usual considerations of the prior art, and will not be appreciably influenced by any specific consideration relating to the instant invention.

An advantage of the present invention is that it provides a simplified and more economical process of producing polymeric materials in the form of elongated shapes as compared with prevailing prior art procedures. A more specific advantage is that it provides a process of preparing methyl methacrylate rods in yields substantially greater than in prevailing prior art processes.

As many apparently widely different embodiments of this invention may be made without departing from the spirit and scope thereof, it is to be understood that the invention is not limited to the specific embodiments thereof except as defined in the appended claims.

The invention claimed is:

1. In a process of polymerizing a liquid polymerizable organic compound in the form of a rod, the steps comprising introducing said polymerizable compound into a vertically positioned, elongated cylindrical casing of a substantially unoriented synthetic linear polyamide closed at the bottom, the wall of said casing being 0.002 to 0.010 inch thick and having a tensile strength equal to $$\frac{PDF}{2T}$$

wherein P is the maximum pressure expressed in pounds per square inch, exerted by said polymerizable compound against the wall of said casing, D is the inside diameter, expressed in inches, of said casing, F is a factor ranging from 3.5 to 5, and T is the wall thickness of said casing expressed in inches, closing the upper end of said casing, and thereafter polymerizing said polymerizable compound contained in said casing while maintaining said casing in vertical position in a gaseous medium.

2. Process as set forth in claim 1 wherein said casing is 12 to 72 inches long and has an inside diameter of 1 to 6 inches.

3. Process as set forth in claim 1 wherein said casing is 12 to 54 inches long and has an inside diameter of 1 to 2 inches.

4. Process as set forth in claim 1 wherein said liquid polymerizable organic compound is methyl methacrylate.

5. Process as set forth in claim 2 wherein said liquid polymerizable organic compound is methyl methacrylate.

6. Process as set forth in claim 3 wherein said liquid polymerizable organic compound is methyl methacrylate.

JOHN BOYKO.

REFERENCES CITED

The following references are of record in the file of this patent:

UNITED STATES PATENTS

| Number | Name | Date |
|---|---|---|
| 2,307,817 | Austin | Jan. 12, 1943 |
| 2,485,798 | Whyte et al. | Oct. 25, 1949 |